United States Patent [19]

Cvek

[11] Patent Number: 5,097,400
[45] Date of Patent: Mar. 17, 1992

[54] HALOGEN LAMP
[75] Inventor: Sava Cvek, Boston, Mass.
[73] Assignee: Luxo Lamp Corporation, Port Chester, N.Y.
[21] Appl. No.: 677,259
[22] Filed: Mar. 29, 1991
[51] Int. Cl.[5] .............................................. F21V 7/00
[52] U.S. Cl. ................................. 362/287; 362/294; 362/345; 362/419; 362/427
[58] Field of Search ............... 362/287, 294, 345, 419, 362/427

[56] References Cited

U.S. PATENT DOCUMENTS

| | | | |
|---|---|---|---|
| 1,500,639 | 7/1924 | Rekar | 362/294 |
| 1,637,786 | 8/1927 | Rekar | 362/294 |
| 1,681,153 | 8/1928 | Johnston | 362/29 X |
| 1,712,865 | 5/1929 | Allyn | 362/427 |
| 2,076,446 | 4/1937 | Carwardine | |
| 2,787,434 | 4/1957 | Jacobsen | |
| 4,449,172 | 5/1984 | Warshawsky | 362/419 |
| 4,516,190 | 5/1985 | Kloots | 362/427 |
| 4,974,135 | 11/1990 | Weh-tsung | 362/287 |

Primary Examiner—Carroll B. Dority
Attorney, Agent, or Firm—Fitzpatrick, Cella, Harper & Scinto

[57] ABSTRACT

A spring balanced lamp is disclosed which includes a base, a lamp arm support pivotally connected to the base, a first pair of hollow tubular arms pivotally connected at one end to the arm support and at their opposite ends to a second pair of hollow tubular arms. At least one counterbalance spring is connected to the arms to maintain the arms in a plurality of stable upright positions to which they may be moved. A lamp head assembly is pivotally connected to the second pair of arms and includes a support neck pivotally connected to the arms and a support ring pivotally mounted on the neck for rotation on an axis which is generally perpendicular to the axis of the pivotal connection of the neck to the arms. A perforated reflector and a translucent shade are mounted on the ring of the reflector.

45 Claims, 9 Drawing Sheets

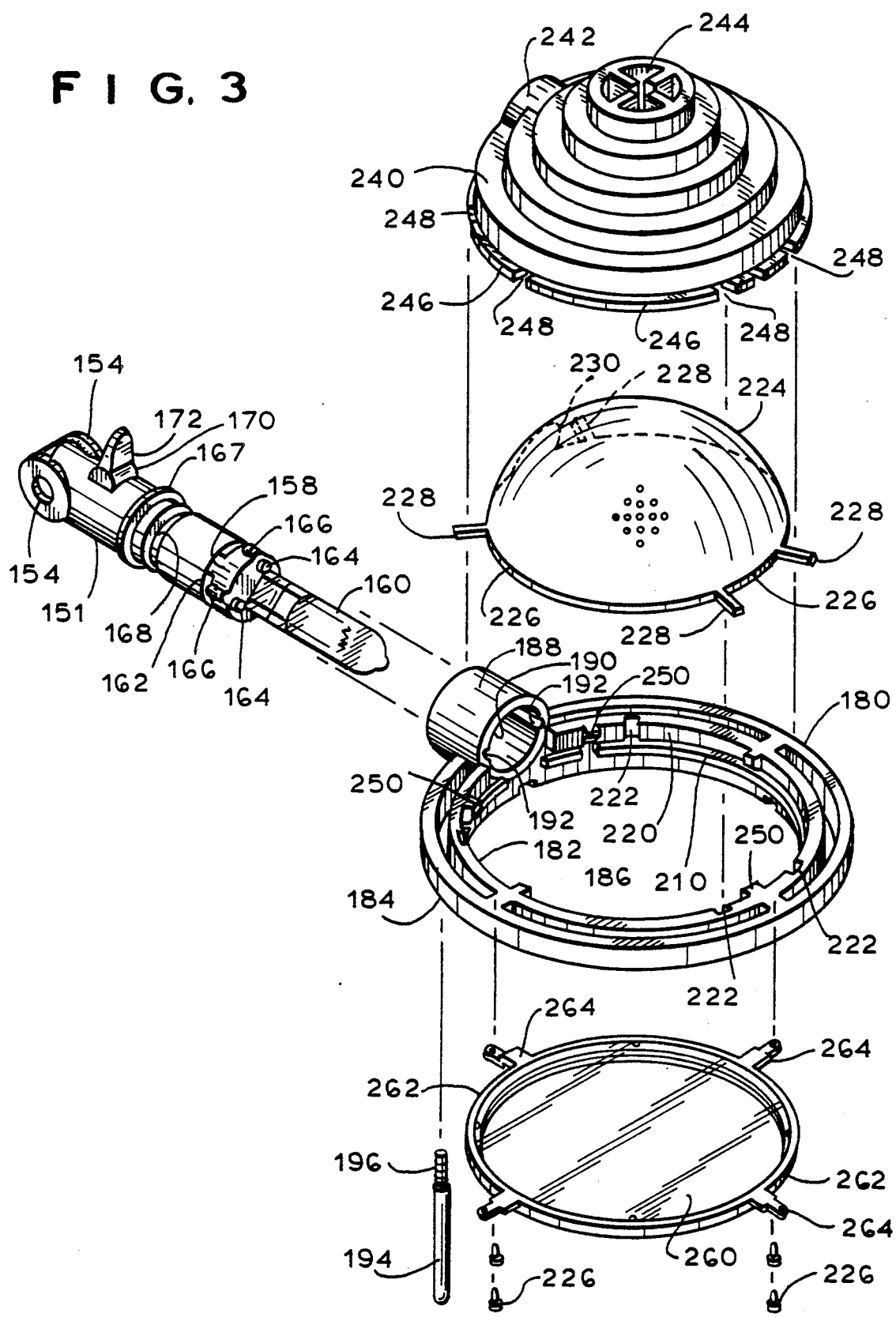
F I G. 3

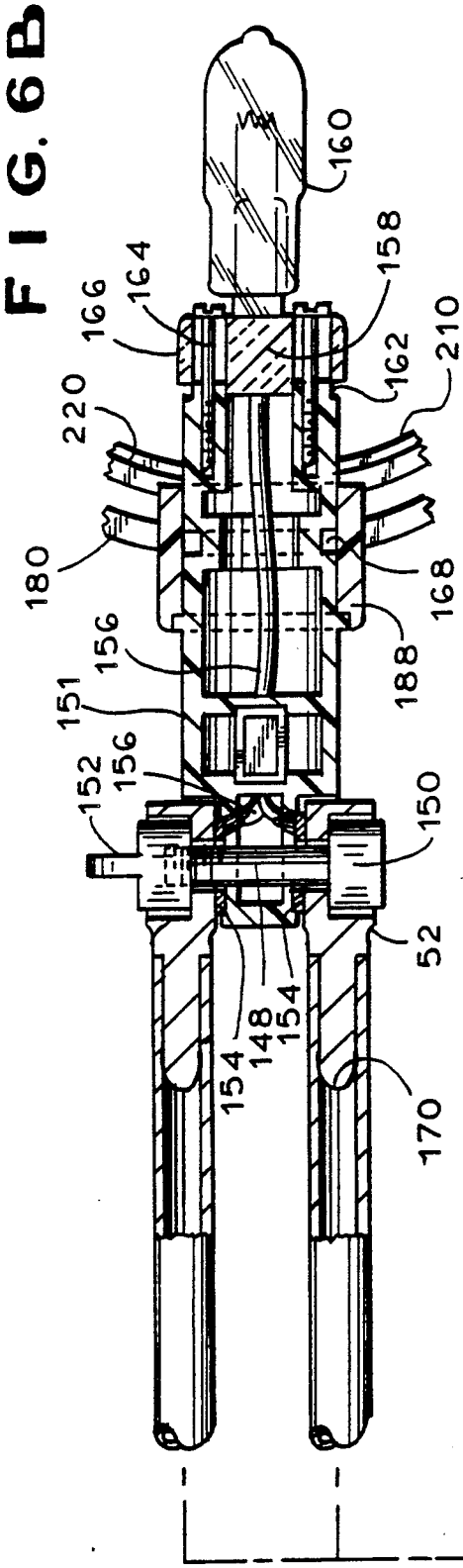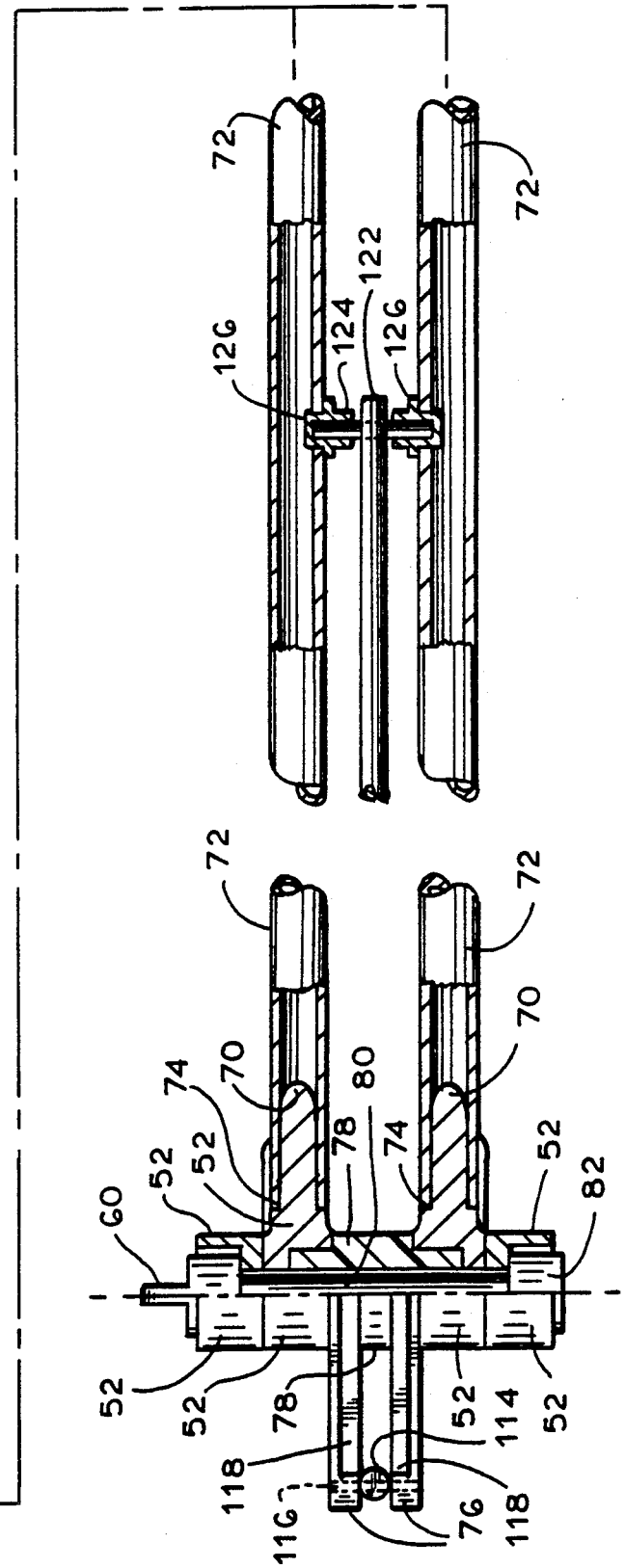

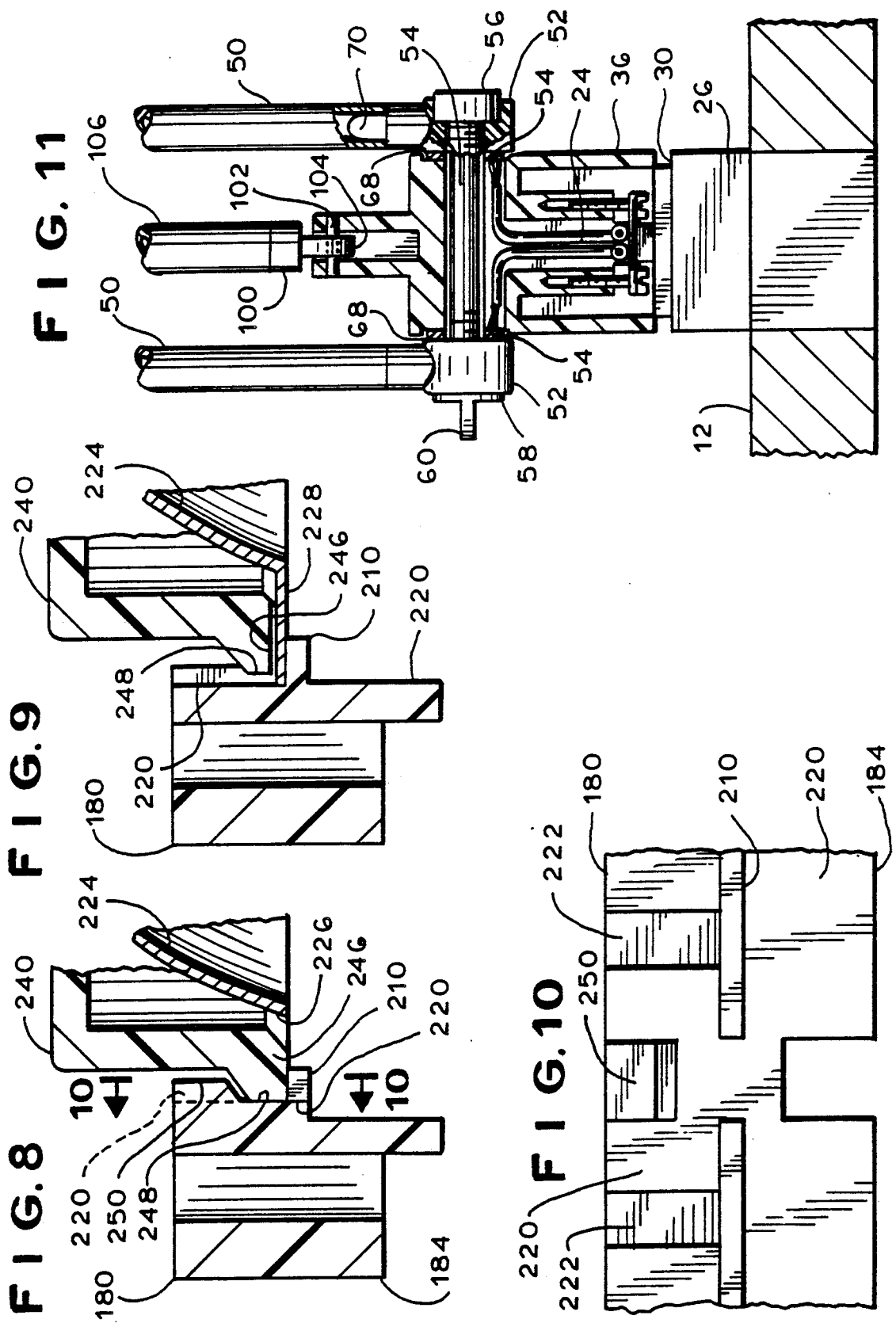

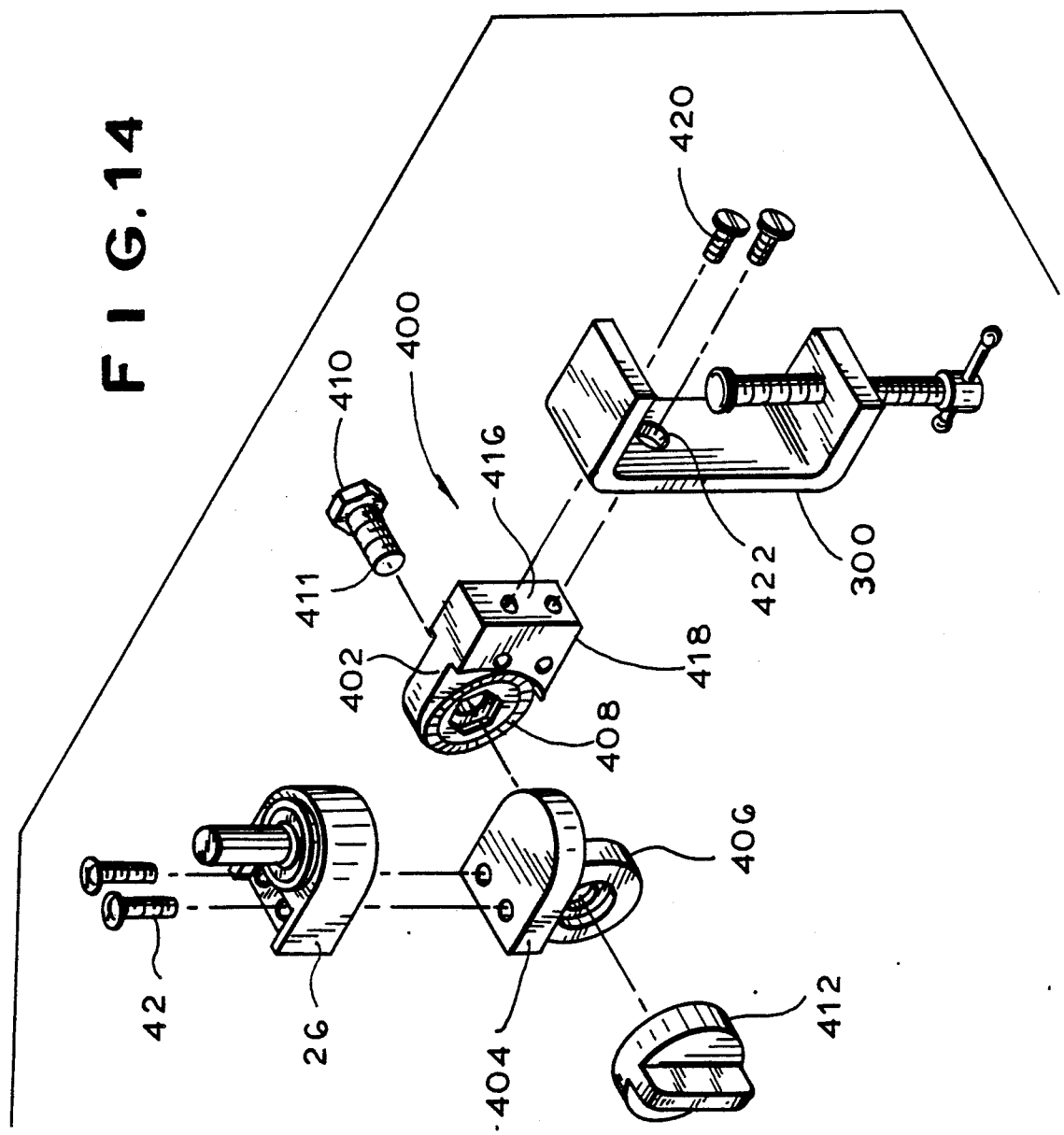

HALOGEN LAMP

The present invention relates to spring balanced arm assemblies, and more in particular to a spring balanced arm and lamp head assembly adapted for use with high heat intensity halogen lamp bulbs.

In recent years, the lighting industry has developed new forms of bulbs for use in light fixtures. One such bulb which has been particularly successful is the halogen light bulb for use in desk lighting lamps or the like in place of conventional fluorescent or incandescent bulbs. Typically, these bulbs have a 50 Watt rating, and use 12 volt current. These bulbs are efficient and economical to use, but also produce a clear crisp white light which is stronger and more intense than light produced by conventional fluorescent or incandescent bulbs. On deficiency of such bulbs is that in addition to the intense light produced, they also produce intense heat.

Because of the high heat produced by halogen bulbs, it has only been recently that such bulbs have come to be used for interior lighting fixtures such as desk lamps. Their use previously has been limited to exterior fixtures in remote positions where they are not likely to be touched by the user or passers-by. However, with the development of smaller bulbs, the desire to use these efficient and high quality bulbs in desk lamps and the like has increased. Unfortunately, such lamps often do not meet U.L. standards because the heat they produce makes it potentially dangerous for the user to touch the lamp shade in which such a bulb is placed. Also, the high intensity of the light produced by the bulb could be damaging to the eyes if viewed directly.

Accordingly, it is an object of the present invention to provide an improved spring balanced arm fixture which is particularly adapted to contain a high intensity halogen bulb.

Another object of the present invention is to provide a lamp head assembly which may be safely used in a desk lamp fixture such as a spring balanced arm fixture.

Another object of the present invention is to produce a lamp head assembly for containing a halogen bulb in which the temperature of the lamp head and its top surface will be less than 90° C.

A further object of the present invention is to provide a lamp head assembly adapted to contain a halogen light bulb which will maintain a relatively cool exterior surface and prevent the bulb or lens beneath the bulb from contacting a support surface on which the lamp is mounted.

In accordance with an aspect of the present invention a lamp head assembly for use in a spring balanced arm light fixture or the like, includes a support neck adapted to be pivotally connected to the lamp head support. For example, the support neck can be pivotally connected to the ends of a pair of arms in a spring balanced lamp arm assembly. The support neck concludes a socket for receiving a high heat intensity lamp bulb such as a halogen bulb. A support ring is pivotally mounted on the neck for pivotal movement about the longitudinal axis of the neck, which is preferably located at 90° to the pivot axis on which the neck is mounted to the support arms of the lamp. It is noted that although the support ring described in this application is referred to as a ring, and is illustrated as being circular, the ring may be in any desired shape, such as for example oval or oblong, and it is not intended that the word ring as used in this application be limited to a circular form.

A light reflector is mounted on the ring on one side thereof. The reflector has a light and heat reflecting surface facing the bulb mounted in the neck and has a plurality of perforations formed therein. The perforations allow light and heat to pass through the reflector from the bulb side thereof to the opposite side. A translucent shade is mounted on the ring above the reflector and is slightly spaced from the reflector. The shade has a central opening form therein to allow escape of heat from the lamp head. The heat will pass from the bulb through the perforations in the reflector to the space between the reflector and the shade. The opening in the shade acts as a chimney allowing the heat to escape. In addition, the perforations allow some of the light to pass through the reflector to illuminate the shade and produce a pleasant visual effect.

A transparent lens is mounted on the ring on the side thereof which is opposite the shade. The ring, reflector, lens and shade are dimensioned and designed, as described hereinafter, so that when they are assembled, they prevent direct viewing of the bulb from the exterior of the head assembly. In addition, the design of the ring, and the use of the perforated reflector, insure that the sides and shade of the head assembly remained relatively cool to the touch. In particular, it has been found that with the construction of the present invention using a 50 Watt halogen bulb, the surface temperature of the lamp head assembly on the ring and the shade does not rise above 90° C.

The lamp head assembly includes a stand-off pin which serves multiple functions. The pin is located to prevent the lens on the lamp head assembly from contacting a support surface to which it might be moved when supported on a light fixture that has movable arms. Moreover, the pin serves as a lock to prevent removal of the support ring from the neck of the assembly while permitting the ring to be rotated on the neck through approximately 360°.

The lamp head assembly of the present invention is particularly adapted for use with a spring balanced support arm arrangement. The lamp includes a base and a lamp arm support pivotally connected to the base. A pair of hollow tubular arms, which serve as electrical conductors when a halogen bulb is used, are pivotally connected to the support at one end and to a second pair of hollow arms at their other end. Counter balance springs are used to allow the relative positions of the arms to the base to be adjusted. A control link is provided between the first and second sets of arms so that the position of the head in the lamp head assembly in space will remain relatively the same regardless of the positions to which the arms are moved. Moreover, the base for the lamp assembly is constructed such that it is adapted to be mounted on a variety of mounting structures, such as a mounting base, a clamp, an inclined surface mount, or a wall mount assembly.

The above, and other objects, features and advantages of this invention will be apparent in the following detailed description of an illustrative embodiment thereof, which description is to be read in connection with the accompanying drawings wherein:

FIG. 3 is an exploded perspective view of the lamp head assembly;

FIG. 6 is a top longitudinal sectional view of the neck of the lamp head assembly and the upper arm assembly;

FIG. 6A is a sectional view taken along lines 6A—6A of FIG. 5;

FIG. 7 is a bottom plan view of the perforated reflector and translucent shade of the present in their assembled configuration;

FIG. 8 is a sectional view taken along line 8—8 of FIG. 2 showing the twist lock retention arrangement for holding the translucent shade in the support ring;

FIG. 9 is a sectional view taken along line 9—9 of FIG. 2 showing the extension fingers of the perforated shade supported on the flange of the support ring;

FIG. 10 is a view taken along line 10—10 of FIG. 8, but with the translucent shade removed;

FIG. 11 is a partial sectional view taken along line 11—11 of FIG. 4;

FIGS. 13 and 14 are perspective views of other mounting systems for the lamp of this invention.

Figure 1:
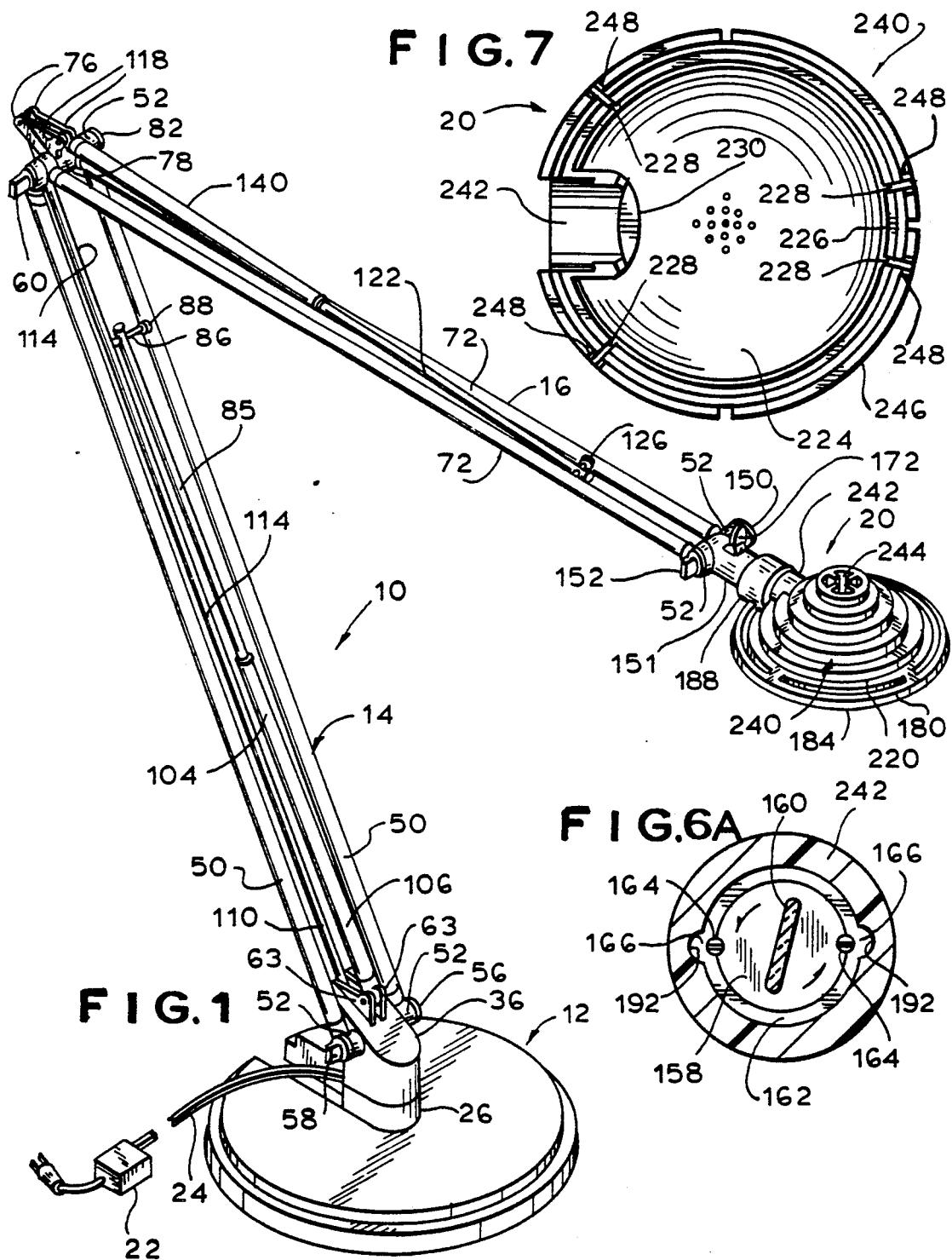
FIG. 1 is a perspective view of a spring balanced lamp constructed in accordance with the present invention.

Referring now to the drawings in detail, and initially to FIG. 1 thereof, a spring balanced light fixture or desk lamp 10, constructed in accordance with the present invention is illustrated. As mentioned above, this lamp is particularly adapted for use with a halogen low voltage bulb.

Lamp 10 includes a support 12 adapted to be placed on the desk or other work surface, a lower pair of spring balanced arms 14, an upper pair of spring balanced arms 16, and a lamp head assembly 20 which contains the halogen bulb.

In the illustrative embodiment of the invention, power is supplied to the lamp through a transformer 22 which is adapted to be connected to a source of 120 volt current. The transformer reduces the current to 12 volts which is then supplied by wire 24 to the lamp. As described hereinafter, using low voltage current in this way arms 14, 16 themselves can serve as conductors, so that no internal wiring is necessary in the arms.

In the illustrative embodiment of the invention, the support or mounting structure 12 is illustrated as a heavy circular metal disk which can sit on a desk or other work surface. The lamp of the present invention is secured through the support structure or disk 12 by a unique base member 26 which is adapted to pivotally mount the lamp for rotation about a vertical axis, and is adapted to be secured to a variety of different support structures.

Figure 4:
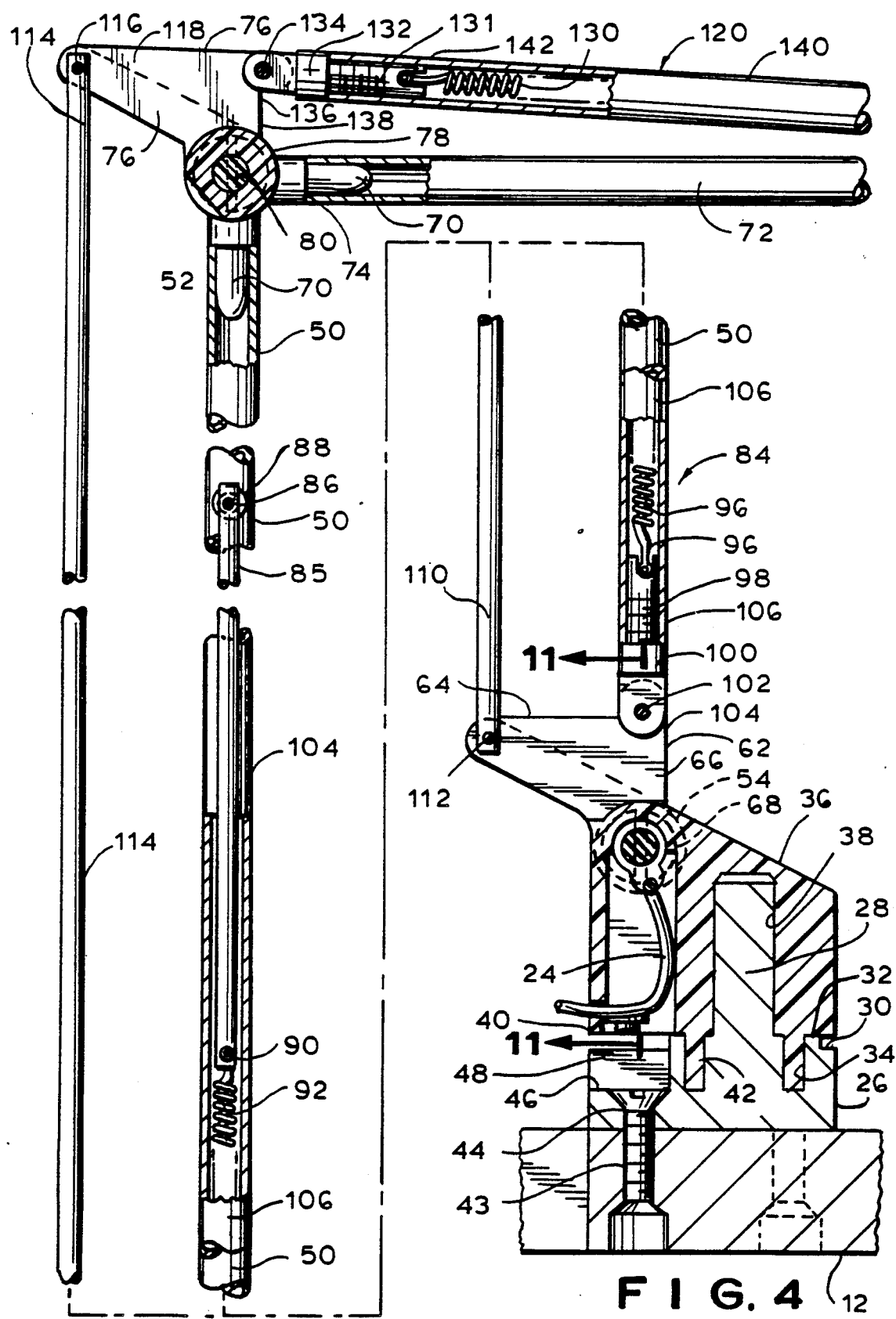
FIG. 4 is an enlarged side view of the base and lower arm assembly of the lamp of FIG. 1, with parts shown in section for clarity.

As illustrated in FIGS. 4 and 11, the base 26 is slightly elongated and has a vertical cylindrical post 28 extending upwardly from one side thereof. The base has a main surface 30 from which a circular ring 32 projects, in the same direction as the post 28. Ring 32 surrounds post 28 and defines a recess 34 in the surface 30 surrounding the post.

The lamp arm assembly of the invention is rotatably mounted on base 26 by the arm support 36. Arm support 36 is a unitary solid plastic or polycarbonate structure which has an internal well or recess 38 formed therein which is adapted to receive the post 28 of base 26. In addition, the lower surface 40 of arm support 36 has a circular wall or ring 42 extending downwardly therefrom which is generally complimentary to the recess or well 34 in base 26. With this construction, wall 42 is received in recess 34 when post 28 is inserted in bore 38. This arrangement permits pivotal rotation of the entire lamp assembly with respect to base 26.

As mentioned, base 26 provides a universal mount for the lamp. In the illustrative embodiment, base 26 is secured to the support disk 12 by a pair of screws 43 secured in the mounting bores 44 formed in the mounting section 46 of base 26. This mounting section includes a recess 48 formed therein at the location of the bores 44.

Figure 13:
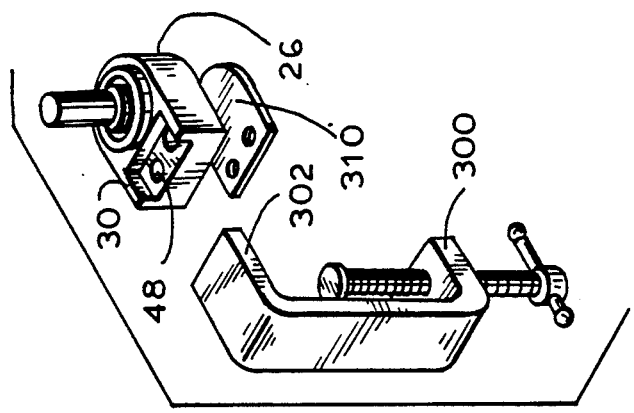
Figure 12:
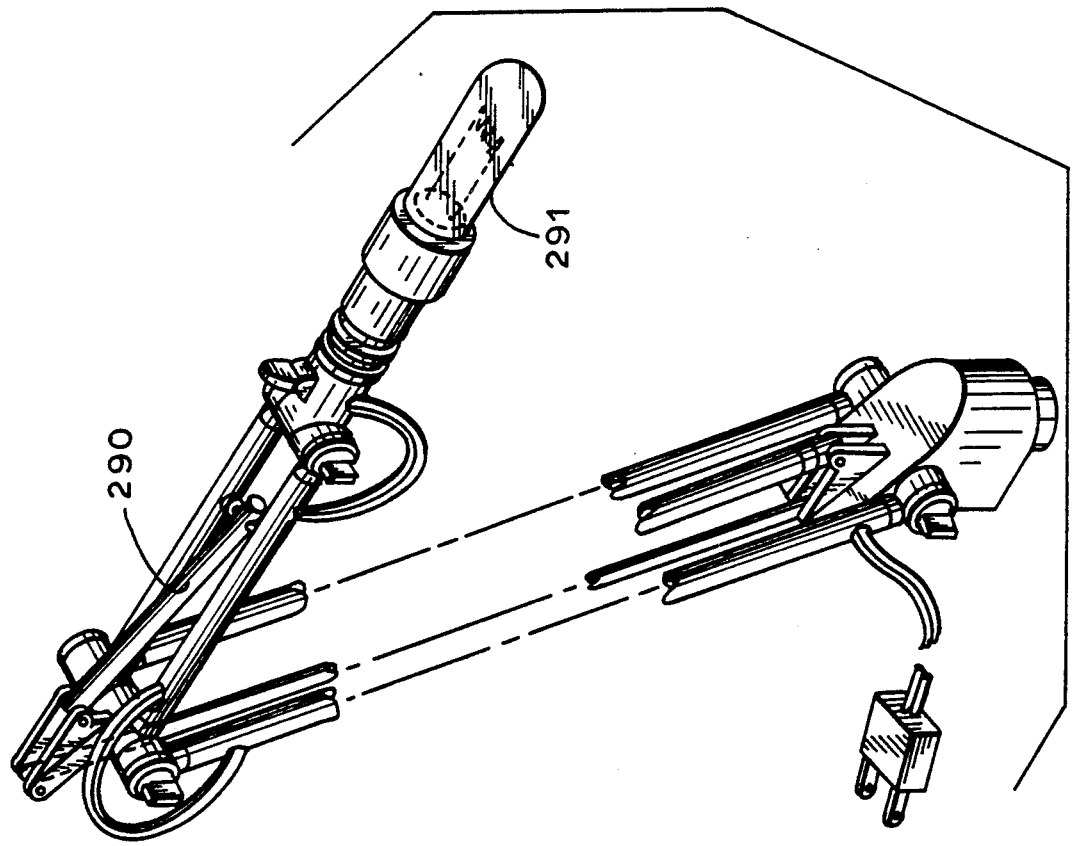
FIG. 12 is a perspective view of another embodiment of the present invention.

In another embodiment of the invention illustrated in FIG. 12 base 26 is used with a clamp 300 to mount the lamp to the edge of a work surface or desk. As seen in FIG. 13 one arm 302 of the clamp is received in the recess 48 to clamp to the base to the work surface. Recess 48 fully accommodates the arm of the clamp so that the arm of the clamp is at least flush with the top surface 30 of the base and does not engage the surface 40 of the arm support 36, thereby to permit free rotation of the arm support with respect to the base. In addition, the bottom surface of base 26 may be provided with a cork pad 310 glued or otherwise secured thereto for protecting the surface of the furniture piece to which it is clamped.

In yet another embodiment illustrated in FIG. 14 an adjustable angle bracket 400 is provided which permits the base to be mounted on an inclined surface. Bracket 400 consists of two elements 402, 404 having cooperating serrated surfaces 406 formed thereon. Each element 402, 404 has a bore 408 formed at the center of its circular serrated surface 406 for receiving a bolt 410. The free end 411 is adapted to engage a threaded knob 412, thereby to clamp elements 402, 404 together in any of a plurality of relative positions.

Bracket element 404 has a pair of threaded bores 414 formed therein adapted to receive bolts 42 which serve to secure the base 26 to the bracket element 404.

Bracket element 406 has two sets of threaded bores 416, 418 formed therein at right angles to each other. These bores are adapted to receive bolts 420 which pass through bores 422 in clamp 300 to secure bracket element 402 in either of two angularly related positions. By this construction the clamp 300 can be secured to an inclined support surface, e.g. a drafting table, and the relative position of bracket elements 402, 404 can be adjusted to position the base 26 in a relatively horizontal position for supporting the lamp.

Returning to FIG. 1, lamp 10 includes a lower spring balanced arm assembly 14. This assembly includes a pair of hollow tubular arms 50 pivotally connected at their lower ends to the arm support 36. As illustrated in FIGS. 1, 4 and 11, each of the arms 50 includes a lower integral sleeve or boss 52 which is adapted to receive a bolt 54. The latter has a head 56 on one end which is received in an under cut portion of one of the sleeves 52. At its opposite end bolt 54 is threadedly engaged with a cylindrical cap 58. The latter has a finger extension 60 which allows the user to tighten or untighten the bolt as it is engaged with the sleeves 52.

Arm support 36 includes an extension 62 defined by a pair of shaped wall members 63 integrally formed on the support. Each wall 63 has a pair of integrally formed sections 64, 66 with the latter extending upwardly above the shank of the bolt 54.

As mentioned above, arms 50 are formed of an electrically conductive material in order to transmit current from wire 24 to the bulb in the lamp head assembly. As seen in FIGS. 4 and 11, this is accomplished by means of a pair of washers 6 positioned between support 36 and the sleeves 52 of the arms 50. The washers are connected to the wires 24 by soldering or the like. As a result, the current in the wires in 24 enters arms 50. Preferably arms 50 and the other metallic components of the arm construction of the invention are coated with a non-conductive polycarbonate material in any known process.

Figure 2:
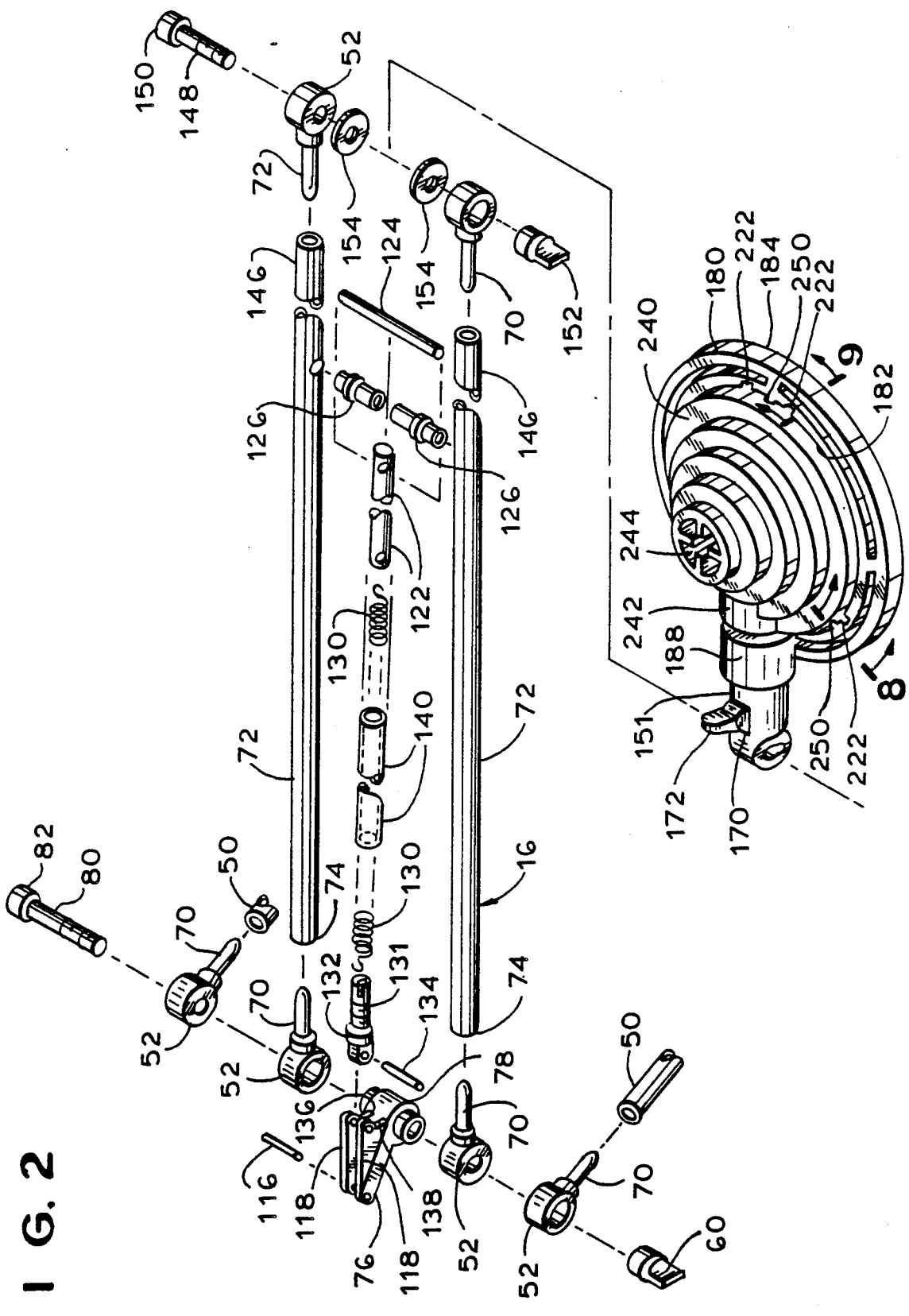
FIG. 2 is an exploded perspective view of the upper arm assembly for the lamp of FIG. 1.

As seen in FIGS. 2 and 11, preferably sleeves 52 are separately formed metallic components, each of which defines the sleeve and a stem 70 which is received in the open lower end of the hollow tube 50. This construction permits ready assembly and disassembly of the parts and interchangeability of some of the parts throughout the construction of the lamp.

The upper end of the arms 50, as seen in FIG. 2, also have bosses 52 thereon. These also are separate elements having projections 70 which are received in the open upper ends of the arms 50. Sleeves 52 at the upper ends of arms 50 are pivotally connected to the lower ends of the upper arm assembly 16. The latter includes a pair of upper arms 72 whose ends 74 are connected to bosses or sleeves 52 such as those previously described which have stems 70 received in the open ends 74 of the arms.

A bell crank 76 is provided at the interconnection between the upper and lower arms. This bell crank includes an integral sleeve or boss 78 on one of its arms.

A bolt 80, similar to bolt 54 previously described, forms the pivotal connection between arms 50 and 72. Bolt 80 includes a head 82 which engages the sleeve 52 of one of the arms 50 and extends through the sleeves 52 and boss 78 of bell crank 76. Its threaded free end is engaged by the finger nut 60. By tightening nut 60, the clamping force on the assembly can be adjusted. Since sleeves 52 are formed of metal and are in mating contact with each other, current supplied to arms 50 as previously described will pass to arms 70.

In order to counterbalance the arm assembly, a spring assembly 84 is provided in assembly 14. This spring assembly includes a relatively rigid rod 85 pivotally connected by a pin 86 to arms 50. The pivotal connection is preferably formed by a pair of polycarbonate sleeves 88 press fit in openings formed in arms 50 and receiving the ends of pin 86. The latter passes through a bore formed in the upper end of the rod 85.

The lower end 90 of rod 85 is connected to a tension spring 92. The lower end 96 of tension spring 92 is connected to the free end of a threaded stud 98. The latter has a head 100 pivotally connected by a press fit pin 102 at the apex 104 defined by the arms 64, 66. Preferably spring 92 and a portion of rod 85 are surrounded by a cylindrical tube 104 having a threaded lower end 106 which threadedly engages stud 98. As a result, sleeve 104 is held in place and serves to conceal both the spring and the connection of spring 92 to rod 85.

Finally, a control link 110 is provided which is pivotally mounted by a press fit pin 112 in the arms 64. The upper end 114 of arm 110 is pivotally mounted by the press fit pin 116 received in the arms 118 of bell crank 76. Control arm 110 will control the position of the bell crank 76 in space, about the pivot bolt 80, as the lower arm assembly 14 is pivoted on the bolt 54. This will serve to keep the relative position of the ar assembly 16 and lamp head 20 to the support surface on which they are mounted constant, regardless of the position to which the lower arm is moved. And, as will be understood by those skilled in the art, the portion of upper arm assembly 16 on the pivot defined by bolt 80 can be varied independently of arm assembly 14.

Figure 5:
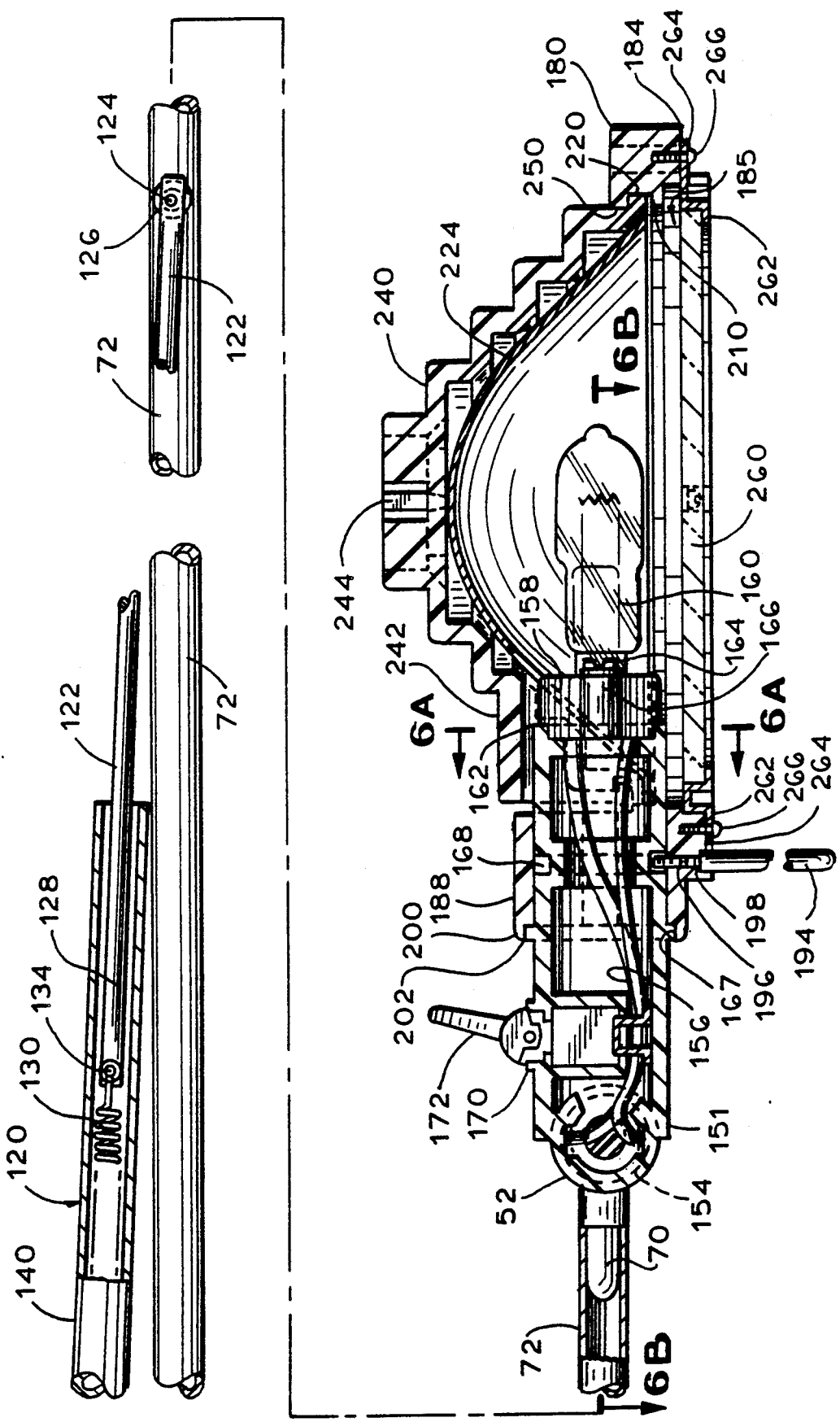
FIG. 5 is an enlarged side view, partly in longitudinal section, of the upper arm and lamp head assembly.

Upper arm assembly 16 may also be spring balanced by a spring assembly 120 similar to the spring assembly 84 previously described. As illustrated in FIGS. 2, 4, and 5 the spring assembly 120 includes a relatively rigid rod 122 pivotally connected by a pin 124 to the arms 72 near the connection of the arms to the lamp head assembly 20. This pivotal connection can be formed by a pair or polycarbonate sleeves 126 press fit in openings formed in the arms 72. The sleeves 126 receive the opposite ends of the pin 124, which passes through an opening formed in the open end of the rod 122. The pin is retained within the sleeves 126 because of the pivot clamp arrangement of the upper and lower ends of the arms.

The opposite end 128 of rod 122 is connected to a tension spring 130. The latter is connected at its opposite end, as seen in FIG. 4, to the free end of a threaded stud 130. The latter has a rear boss 132 which is pivotally connected by a press fit pin 134 or the like to the apex 136 formed between the arms 118 and 138 of the bell crank 76. A hollow sleeve 140 is additionally provided in the spring assembly 120. The sleeve receives a portion of the rod 122 and surrounds the spring 130. Its end 142 is threadedly engaged with stud 131 to hold the sleeve in place about the spring, thereby to conceal the spring and the connection of the spring to rod 122.

As seen in FIGS. 2, 5 and 6b, the upper or outer ends 146 of arms 72 have sleeves or bosses 52 which, as with the previously described connections, are separate elements having studs 70 received in the opened ends of the arms. A threaded bolt 148 having a head 150 connects the sleeves 52 to the lamp head assembly. The latter includes a neck 151 whose rear end 152 has a bore 154 formed therein to receive the shank of bolt 148, between the sleeves 52 at the upper ends of the arm 72. As seen in FIG. 6, the head 150 of bolt 148 is received in a recess of the boss 52. The free opposite end of the bolt 148 is threadedly engaged with a finger nut 153 which holds the assembly together and provides an adjustable clamping force.

In order to transmit electric current to the lamp head assembly a pair of metallic washers 154 are provided in contact between the inner faces of the sleeves 52 and the adjacent surfaces of the neck 151 (see FIG. 6b). The latter is formed of a plastic polycarbonate material and is non-conductive. The washers 154 are in electrical contact, by soldering or the like, with the ends of wires 156 which transmit the current to the socket 158 in the lamp head assembly in which the halogen bulb 160 is mounted.

Neck 151 is generally cylindrical in shape and has an open free end 162. The socket 158 is bolted to the free end 162 of the neck by screws 164 or the like. Socket 158 is of conventional and of known construction and has a pair of diametrically opposed ribs 166 formed thereon, as seen in FIG. 6A. These ribs are used in accordance with the present invention to prevent inadvertent removal of the lamp head assembly as described hereinafter.

The cylindrical sleeve defined by neck 151 includes an annular flange 167 formed therein as well as an annual groove 168 formed between the flange 167 and socket 158. These elements are used, as described hereinafter, to control the position of the lamp head assembly on the neck. Finally, neck 151 includes a mounting boss 170 in which a control switch 172 is secured in any convenient manner. The switch is connected to wires 156 to control operation of the bulb.

The lamp head assembly of the present invention is designed to insure that the surface temperature of the lamp head, particularly its peripheral edges and top surface, which are most likely to be engaged by hand by the user, will have relatively low temperatures, despite the high temperature of the bulb contained in the head. In addition, it is designed to prevent the user from looking directly at an unexposed halogen bulb, since the bright light intensity of the bulb could be damaging to the human eye.

As illustrated in FIGS. 3 and 4, lamp head assembly 20 includes a support ring 180. As mentioned above, this ring although illustrated as being circular, can have any desired shape, such as oval or oblong, and the use of the word ring is not intended to limit the configuration of this structure.

Support ring 180 is actually formed as two rings; an inner ring 182 and an outer ring 184 connected to the inner ring by three radial arms 186. In addition, a mounting sleeve 188 is provided integrally formed with rings 182, 184. Mounting sleeve 188 has an internal bore 190 formed therein including diametrically opposed internal grooves 192. The latter are complimentary to bosses 166 formed on the socket 158, so that the sleeve can only be put on or taken off of neck 150 when the bosses 166 and grooves 192 are aligned. This will aid in preventing inadvertent removal of the sleeve and thus the lamp head assembly 20 from the neck 150.

In order to insure against inadvertent removal, a dual purpose stand-off pin 194 is provided. This pin, as illustrated in FIG. 5 has a threaded upper-end 196 threadedly engaged in the outer ring 184 of ring 180, at the location of the sleeve 188. The free end of the pin 194 enters the bore 190 of the sleeve, but the shoulder 198 formed between the pin and its threaded portion 196 defines a stop which limits the degree of insertion of the pin into the bore 190. Shoulder 198 is dimensioned relative to the ring such that the extreme end of the pin 194 will enter bore 190 and the groove 168 formed in the sleeve, but will not contact the base of the sleeve. This arrangement permits the sleeve and thus the lamp head assembly to rotate on the neck through 360°, but prevents the lamp head assembly from being removed from the neck until the pin 194 is intentionally disengaged from the ring.

The rear end 200 of sleeve 188 has an undercut bore portion 202 formed therein which receives flange 166 of the neck 151. Flange 166 and undercut bore 202 are dimensioned such that the flange forms a stop against sleeve 188 when the head is installed on the neck, so that the groove 168 is aligned with the position of the pin 194.

Referring again to FIG. 3, it is seen that the inner ring 182 of support ring 180 includes an internal flange 210 formed therein. The inner surface 220 of the inner ring 182 also includes a plurality of vertical notches 222 formed in predetermined locations along its face above the flange 210. These notches and the flange 210 serve to permit mounting of the light reflector 224 of the present invention.

Reflector 224 is a generally semi-circular or parabolic reflector formed of a plastic or metallic material. Its inner face, i.e., the side facing the bulb 160, is preferably painted or coated with a light reflective material. The reflector has a peripheral edge portion 226 from which four fingers 228 extend. These fingers are located to be received in the grooves or notches 222 on the inner face of inner ring 182 where they will rest on the upper surface of the inner flange 210. In addition, a portion 230 of the reflector is cut out, as seen at FIG. 3, in order to accommodate socket 158 and the neck of the lamp which enters the reflector, as also seen in FIG. 5.

In accordance with the present invention reflector 224 is perforated with small holes throughout its entire surface. For clarity and convenience only some of the perforations are illustrated in the drawing, but it is to be understood that substantially the entire surface is perforated with these small holes.

The small holes in reflector 224 are dimensioned and selected to permit about 20% of the light from the bulb to pass through the reflector with the remaining 80 to 90 percent being reflected downwardly through ring 180. In addition, the openings in the reflector permit heat trapped beneath the reflector to flow through the reflector for discharge to the atmosphere. This prevents heat build-up and aids in keeping the surface temperature of the lamp head at the desired low temperature range.

Lamp head assembly 20 includes a shade 240, preferably formed of a translucent plastic material. In the illustrative embodiment of the invention, the shade has a generally pyramidal shape in cross section, defined by a plurality of annular rings or steps. However, it is to be understood that the shape of the shade is decorative and can be formed in any desired shape. The shade has an opening 242 formed therein designed to accommodate the neck of the lamp, as seen also in FIG. 5 when the shade is installed.

Shade 240 includes a central opening 244 formed therein which permits heat to escape from the lamp head assembly, and in particular from the space between the shade and the reflector, as seen in FIG. 5.

Shade 240 also includes an peripheral flange 246 which is generally complimentary to the shape and dimension of the flange 210 of the inner ring 182 of support ring 180. Flange 246 has a plurality of notches 248 formed therein and its top surface 25' may be slightly inclined, as seen in FIGS. 8 and 9.

The inner surface 220 of ring 182 includes five inwardly projecting teeth 250, which are adapted to overlie flange 246, when the shade is installed. Notches 248 in flange 246 are located to mate with and receive the fingers 250. This arrangement permits the shade to be received within ring 182 so that the bottom surface 249 of flange 246 rests on the fingers of shade 224 with the neck opening 242 slightly offset from neck 188. The shade is then rotated clockwise, as seen in FIG. 3, until four of the notches 248 overlie the fingers 224 so that the fingers enter the notches and the bottom surface 249 of flange 246 rests directly on flange 210. In this position flange 246 is located below fingers 250 and fingers 224 are contained in notches 248. As a result, the shade is locked in the ring and cannot be removed. And, in that predetermined position, the opening 240 is aligned with neck 188.

With this construction, it is not possible for the user to look directly at the bulb 160 through the shade or reflector, even at the points where the shade is mounted in the support ring. In addition, because the support ring 180 is formed as a double ring with a space between the rings 182 and 184, the periphery of the ring 180 will be cooled by convection air flow through the space between the rings. Thus, the outer ring 184 is maintained at relatively low temperatures.

A transparent protective lens 260 is also provided in lamp head assembly 20. This lens is preferably formed of lexan or other suitable plastic material. The lens can be transparent, although preferably it may be textured in order to better disburse light from the bulb.

Lens 260 is secured to ring 180 by a peripheral support ring 262. This ring includes an internal flange 264 on which the lens sits.

The shape of the ring 262 is generally complimentary to but smaller than the shape of flange 210.

Ring 262 includes a plurality of ears or tabs 264 which extend radially outwardly from the ring. These tabs are secured to the outer ring 187 of the lamp head assembly by screws 266 or the like. By constructing the lens support arrangement to the ring 180 in this manner, a small peripheral space 185 is formed between ring 262 and the inner face 210 of the ring to allow air flow into the lamp head by convection for cooling. However, by this construction, as seen in FIG. 5, it is not possible to look directly at the bulb, even from the bottom of the lamp head assembly.

As mentioned above, pin 194 provides a dual purpose in the invention in the present invention. As illustrated in FIG. 5, the pin provides a stand-off for the lamp head assembly so that should the lamp head inadvertently be moved down towards the support surface on which the lamp is placed, lens 260 cannot come into direct contact with the support surface. The stand-off 164 would engage the work surface first causing the lens to remain remote from the work surface, thereby avoiding the danger of fire to papers on the work surface.

In another embodiment of the invention illustrated in FIG. 12, a smaller upper arm assembly is utilized. In that case, since there are smaller leverage forces involved in the lamp head, it is not necessary to use an additional counterbalance spring assembly. Accordingly, only a relatively rigid rod 290 is used in place of the counterbalance spring assembly. In addition, in this embodiment an incandescent bulb 291 rather than a halogen is illustrated. Since this type of bulb requires 120 volt electrical service, the arms of the lamps cannot be used as supply conductors. However, since the arms of the lamps are hollow the current supply wires 24 may be extended through the arms as illustrated.

Accordingly, it is seen that a relatively simply constructed lamp and lamp head assembly are provided in a spring balanced lamp. The lamp construction permits the use of high heat intensity halogen bulbs at low voltage. The construction of the lamp head assembly insures that the surface temperature of the lamp head is within safe tolerances and below 90° C. It also insures that the user cannot directly view the bulb itself.

Although the invention is particularly directed to a lamp fixture using low voltage current supply to a halogen bulb, the identical construction can be used with a conventional incandescent or fluorescent bulb, simply by changing the socket and the bulb. Although illustrative embodiments of the present invention have been described herein with reference to the accompanying drawings, it is to be understood that the invention is not limited to those precise embodiments and that various changes and modifications may be affected therein by those skilled in the art without departing from the scope or spirit of this invention.

What is claimed is:

1. A lamp head assembly for a high heat intensity lamp comprising a support neck adapted to be connected to a lamp head support and including a socket for receiving a high heat intensity lamp bulb, a support ring mounted on said neck for rotational movement about the longitudinal axis of the neck, a light reflector mounted on said ring on one side thereof, said light reflector having a light and heat reflecting surface on one side thereof facing the bulb and having a plurality of perforations formed therein to allow light and heat to pass therethrough, a translucent shade mounted on said ring above said reflector and having a central opening formed therein to allow escape of heat from the lamp head, and a transparent lens mounted on said ring on the side thereof opposite said shade, and means on said assembly for preventing said lens from engaging a support surface therebelow, said ring, reflector, lens and shade being dimensioned and engaged when assembled to prevent direct viewing of the bulb from the exterior of the assembly.

2. A lamp head assembly as defined in claim 1 wherein said ring includes an internal ring member engaged with said reflector and shade and an external ring member surrounding and spaced from the internal ring member whereby the periphery of the lamp head is thermally insulated from the internal ring.

3. A lamp head assembly as defined in claim 1 including a bulb and wherein said bulb and ring include cooperating means for preventing disengagement of said shade from said neck except in a predetermined number of relative angular positions.

4. A lamp head assembly as defined in claim 1 wherein said neck has an annular groove formed therein and said means for preventing said lens from engaging a surface therebelow comprises an elongated pin removably mounted on said ring and extending perpendicularly to the longitudinal axis of the bulb and to the plane of the lens, said pin having an inner end extending into said groove, whereby said pin prevents removal of the ring from the neck when it is engaged in the ring.

5. A lamp head assembly as defined in claim 3 wherein said neck has an annular groove formed therein and said means for preventing said lens from engaging a surface therebelow comprises an elongated pin removably mounted on said ring and extending perpendicularly to the longitudinal axis of the bulb and to the plane of the lens, said pin having an inner end extending into said groove, whereby said pin prevents removal of the ring from the neck when it is engaged in the ring.

6. A lamp head assembly as defined in claim 5 wherein said pin is threadedly engage in said ring.

7. A lamp head assembly as defined in claim 1 wherein said ring has an inner flange and said reflector has a lower peripheral edge which is generally complimentary to the flange but spaced therefrom, said reflector including a plurality of fingers extending outwardly from its peripheral edge and seated on said flange whereby a peripheral space is defined between the reflector and the ring to allow heat to pass by convention from beneath the reflector to the space between the reflector and the shade and to reduce heat transfer from the reflector to the ring.

8. A lamp head assembly as defined in claim 7 wherein said shade includes a peripheral flange which is generally complimentary to the inner flange of the ring and is adapted to overlie the inner flange of the ring and the fingers of the reflector, said flange having a plurality of notches formed therein at least some of which are adapted to receive said fingers of the reflector, and means on the ring for engaging the shade and preventing removal from the ring when the shade is rotated to align the notches with the fingers.

9. A lamp head assembly as defined in claim 8 wherein said lens is generally complementary in plan to the periphery of said inner flange of the ring and includes a mounting bezel peripherally engaging the lens and including a plurality of outwardly ending fingers; and means for removably mounting said fingers to the ring thereby to reduce heat transfer from the lens to the ring and prevent direct viewing of the bulb.

10. A lamp head assembly as defined in claim 9 wherein the lens is smaller than said flange to leave a gap therebetween which mounts air to enter the head assembly.

11. A lamp head assembly for a high heat intensity lamp comprising a support ring, a perforated reflector for heat and light mounted on one side of said support ring; a translucent shade mounted on said ring above and slightly spaced from said reflector; a transparent lens mounted on said ring on the side thereof opposite said reflector, said ring, shade, lens and reflector including cooperating means for holding said elements in an assembled relationship wherein direct viewing of a bulb mounted in the assembly between the reflector and lens is prohibited and the temperature on the surface of the shade is not more than 90° C.

12. A lamp head assembly as defined in claim 11 including means for preventing the lens from engaging a support surface therebelow.

13. A lamp head assembly as defined in claim 1 including cooperating means on said ring and neck for locating the bulb at a predetermined position beneath the reflector when said ring and neck are engaged.

14. A universal mounting adapter for a lamp including a base and means in said base for securing said base to a mounting structure, said base including a support post offset from said securing means and a circular upstanding ring surrounding said post and spaced therefrom to define a circular well therebetween.

15. A universal mounting adaptor as defined in claim 14 wherein said mounting means includes at least one mounting hole formed in the base for receiving a bolt to secure the base to a mounting structure, and a recess in the base at said hole to receive a portion of the mounting structure.

16. A universal mounting adaptor as defined in claim 14 wherein said base has a main surface portion, said post and ring projecting above the main surface portion and said well projecting therebelow, said mounting means comprising a recess formed in said main surface adjacent an edge of the base for receiving and engaging a portion of the mounting structure.

17. A universal mounting assembly for a lamp comprising a base having a first surface portion, a support post projecting from and above said first surface portion, a circular guide ring projecting from said first surface portion and surrounding said post in spaced relation thereto, said post and ring defining a circular well therebetween; and a lamp arm support having means thereon for engaging a lamp support arm and having a lower surface including an elongated recess formed therein for receiving the post of the base and a circular wall, complementary to the well in the base, said circular wall being received in said well whereby said ring, well, wall and post cooperate to provide a pivot structure for the arm support on the base.

18. A universal mounting assembly for a lamp as defined in claim 17 wherein said base includes means for mounting the base to a mounting structure.

19. A universal mounting assembly as defined in claim 18 wherein said mounting means includes a recess formed in said base for receiving and engaging a portion of the mounting structure with the mounting structure being at most flush with said first surface portion of the base to avoid interference with pivotal movement of the lamp arm support.

20. A spring balanced lamp comprising a base, a lamp arm pivotally connected to said base, a first pair of hollow tubular arms pivotally connected at one end to said support and at their opposite ends to the first ends of a second pair of hollow arms, a bell crank pivotally connected to the opposite ends of said first pair of arms about the same axis as the pivotal connection with said second pair of arms, a first control link pivotally connected at one end to said bell crank and at its opposite end to said support, and a second control link pivotally connected between said bell crank and said second pair of arms, counter balance spring means connected between said support and said first pair of arms for maintaining said arms in selected upright positions, and a lamp head assembly, and means for pivotally connecting said lamp head assembly to said second pair of arms, said lamp head assembly including a support neck and means for rotatably connecting said support neck to said second pair of arms and adapted to support a light bulb therein, a support ring means pivotally mounting said support ring on said neck for rotation about the neck on an axis which is located generally perpendicularly to the axis of pivot connection of the neck to said second pair of arms, a reflector mounted on said ring, and a shade mounted on said ring above said reflector.

21. A spring balanced lamp as defined in claim 20 wherein said base includes means for securing the base to a mounting structure, a support post on said base offset from said securing means, and a circular upstanding ring surrounding said post and spaced therefrom to define a circular well therebetween, said lamp arm support having an elongated recess formed therein for receiving said post to permit relative pivotal movement.

22. A spring balanced lamp as defined in claim 21 wherein said lamp arm support has a circular ring wall formed therein surrounding said recess and extending in the opposite direction therefrom, said wall being complementary to the well in said base, said well receiving said wall whereby said ring, well, wall and post cooperate to provide a pivot structure for the arm support on the base.

23. A spring balanced lamp as defined in claim 20 wherein said hollow arms are formed of electrically conductive materials and said arm support and neck are formed of non-conductive materials.

24. A spring balanced lamp as defined in claim 23 wherein said arms are coated with a non-conductive material on their outer surfaces.

25. A spring balanced lamp as defined in claim 24 wherein the neck is adapted to receive a halogen low voltage bulb and said arm support includes means for conducting low voltage current to said one end of said first arms and said neck includes means for receiving current from said second arms for supply to the bulb.

26. A spring balanced lamp as defined in claim 20 wherein said counter balance spring means comprises a rigid link pivotally connected at one end to said first pair of arms near their connection to the second pair of arms, and a tension spring connected at one end to the opposite end of said rigid link and at its other end to said arm support.

27. A spring balanced lamp as defined in claim 26 including a hollow sleeve surrounding said spring.

28. A spring balanced lamp as defined in claim 27 wherein said spring means includes a spring anchor pivotally connected to said arm support and having a threaded stem extending therefrom, said spring being connected to said stem and said sleeve being threadedly engaged therewith surrounding the spring to conceal the same.

29. A spring balanced lamp as defined in claim 26 wherein the arms of said bell crank define an apex therebetween and said second control link comprises a rigid link connected between the apex between the arms of the bell crank and said second pair of arms, near said neck.

30. A spring balanced lamp as defined in claim 26 wherein the arms of said bell crank define an apex therebetween and said second control link comprises a second counter balanced spring means connected between the apex between the arms of the second bell crank and said second pair of arms, near said neck.

31. A spring balanced lamp as defined in claim 30 wherein said second counter balance spring means comprises a rigid link pivotally connected at one end to said second pair of arms near their connection to said neck and a tension spring connected at one end to the opposite end of said rigid link and at its other end to said second bell crank.

32. A spring balanced lamp as defined in claim 20 wherein said reflector is perforated and said shade is translucent.

33. A spring balanced lamp as defined in claim 32 including a transparent lens mounted on said ring on the side thereof opposite said reflector, said ring, shade, lens and reflector including cooperating means for holding said elements in an assembled relationship wherein direct viewing of a bulb mounted in said neck between the reflector and the lens is prohibited.

34. A spring balanced lamp as defined in claim 33 including means for preventing the lens from engaging a support surface therebelow.

35. A spring balanced lamp as defined in claim 34 including cooperating means on said ring and neck for locating the bulb at a predetermined position beneath the reflector when said ring and neck are engaged.

36. A spring balanced lamp as defined in claim 32 wherein said shade has a central opening formed therein to allow escape of heat from the lamp head.

37. A spring balanced lamp as defined in claim 36 wherein said ring includes an internal ring member engaged with said reflector and shade and an external ring member surrounding and spaced from the internal ring member to thermally insulate the internal ring.

38. A lamp head assembly as defined in claim 37 wherein said bulb and ring include cooperating means for preventing disengagement of said shade from said neck except in a predetermined number of relative angular positions.

39. A lamp head assembly as defined in claim 38 including means for preventing the lens from engaging a support surface therebelow.

40. A lamp head assembly as defined in claim 39 wherein said neck has an annular groove formed therein and said means for preventing said lens from engaging a surface therebelow comprises an elongated pin removably mounted on said ring and extending perpendicularly to the longitudinal axis of the bulb and to the plane of the lens, said pin having an inner end extending into said groove, whereby said pin prevents removal of the ring from the neck when it is engaged in the ring.

41. A lamp head assembly as defined in claim 40 wherein said pin is threadedly engaged in said ring.

42. A lamp head assembly as defined in claim 41 wherein said ring has an inner flange and said reflector has a lower peripheral edge which is generally complimentary to the flange but spaced therefrom, said reflector including a plurality of fingers extending outwardly form its peripheral edge and seated on said flange whereby a peripheral space is defined between the reflector and the ring to allow heat to pas by convention from beneath the reflector to the space between the reflector and the shade and to reduce heat transfer from the reflector to the ring.

43. A lamp head assembly as defined in claim 42 wherein said shade includes a peripheral flange which is generally complimentary to the inner flange of the ring and is adapted to overlie the inner flange of the ring and the fingers of the reflector, and means on ring for engaging the shade to hold the reflector therebetween.

44. A lamp head assembly as defined in claim 43 wherein said lens is generally complementary in plan to the periphery of said inner flange of the ring and includes a mounting bezel peripherally engaging the lens and including a plurality of outwardly ending fingers; and means for removably mounting said fingers to the ring thereby to reduce heat transfer from the lends to the ring and prevail direct viewing of the bulb.

45. A lamp head assembly as defined in claim 44 wherein the lens is smaller than said flange to leave a gap therebetween which mounts air to enter the head assembly.

* * * * *